Patented May 16, 1950

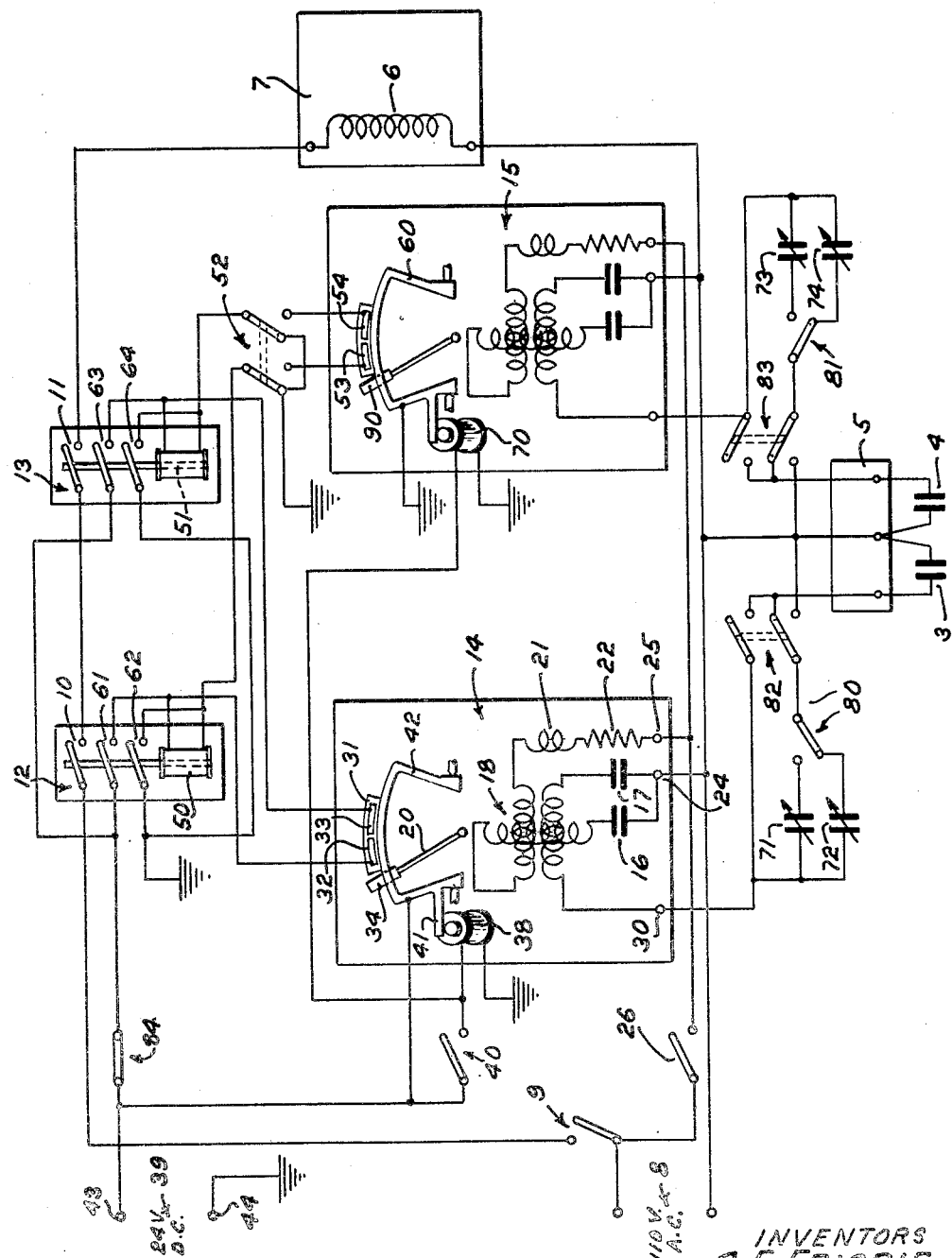

2,507,565

UNITED STATES PATENT OFFICE 2,507,565

ELECTRICAL TESTING APPARATUS

Stewart E. Frisbie, Danville, and Gilbert E. Weeks, Chicago, Ill., assignors, by direct and mesne assignments, to Western Electric Company, Incorporated, New York, N. Y., a corporation of New York Application August 30, 1948, Serial No. 46,793

4 Claims. (Cl. 175—183)

This invention relates to electrical testing apparatus and more particularly to automatic condenser testing apparatus.

An object of this invention is to provide a new and efficient apparatus for determining electrical characteristics of articles.

In accordance with one embodiment of this invention an apparatus for ascertaining whether or not the capacity of a condenser falls between predetermined maximum and minimum limits is provided with a microfarad meter which is responsive to the capacity of a condenser under test and which is adapted to close a circuit to a relay if the capacity of the condenser is above the minimum and also to close a circuit to a second relay if the capacity is below the permitted maximum capacity. The two relays, when operated contemporaneously, close a circuit to an acceptance device for either indicating a successful test or for mechanically providing the acceptance of a condenser which successfully passes the test.

A complete understanding of the invention will be had by referring to the following detailed description taken in conjunction with the accompanying single figure drawing which diagrammatically illustrates the invention.

The apparatus described herein may be used to check the capacity of a single condenser 3 or two condensers 3 and 4, simultaneously, the condenser or condensers under test being placed in a test fixture 5 which supports the condensers and connects them with the test circuit. The object of the test is to energize the operating coil 6 of an acceptance device 7 if the capacity of the condenser under test falls within the required maximum and minimum limits. In case the condenser under test should fail the test, then the operating coil 6 is to remain deenergized. The acceptance device 7 may be an indicator or it may be a mechanical device for causing the separating of good condensers from bad ones. When energized the operating coil 6 receives its electrical power from a source of electrical current 8 through a closed switch 9 and the closed contacts 10 and 11 of relays 12 and 13, respectively, the relay 12 being energized if the capacitance under test is below the maximum limit and the relay 13 being energized if the capacitance under test is above the minimum limit. The relays 12 and 13 are operable in response to the capacity registered on a pair of capacitance measuring devices 14 and 15 known as microfarad meters. The two meters being similar in construction, only the one designated 14 will be described in detail.

The meter 14 is provided with an impedance network including condensers 16 and 17, a moving coil assembly 18 for carrying an indicating needle 20, a field coil 21 and a resistor 22. To operate the meter a fixed frequency alternating current from the source 8 is applied to the impedance network through meter terminals 24 and 25 when a switch 26 is closed. Capacitances to be measured are connected to the terminal 24 and a terminal 30 thus effecting a change in the impedance of the network and causing the moving coil assembly 18 to move relative to the field coil 21 thereby moving the needle 20 across a scale 31 which, in a normal microfarad meter, is calibrated in units of capacity.

The meter 14 is provided with means operable in response to the capacity of the condenser under test for closing external circuits to operate the relays 12 and 13. Two metallic contact segments 32 and 33 are mounted next to each other in predetermined cut-out portions of the meter scale representing conditions above and below a predetermined capacity. The two segments are insulated from each other and the physical distance between them is as small as possible without the two segments touching. At its upper end the needle 20 is provided with a contact 34 which is adapted, when the end of the needle is depressed, to engage either contact 32 or 33 depending on its position along the meter scale. In order to depress the end of the needle 20 when desired, a relay 38 operable from a source of electrical power 39 through a switch 40 is mounted on the meter 14 and is provided with a movable armature 41 which, upon the energization of the relay 38, will operate a metallic depressor bar 42 to force the contact 34 to engage either of the segments 32 or 33. When depressed the contact 34 engages not only the segment below it but also the metallic depressor bar 42 thereby forming an electrical connection between the depressor bar and either of the contact segments 32 or 33. The depressor bar 42 is connected to one side 43 of the source of power 39 whose other side 44 is grounded. Contact segment 32 is connected to one end of the operating coil 50 of the relay 12, and contact segment 33 is connected to one end of the operating coil 51 of the relay 13. The other ends of the operating coils 50 and 51 may, by means of a switch 52, be connected directly to ground or to contact segments 53 and 54, respectively, of the microfarad meter 15 whose depressor bar 60 is connected to ground. A relay 70 for operating the depressor bar 60 is connected in parallel with the relay 38 to operate simultaneously therewith.

The relay 12 is provided with three sets of normally open contacts 10, 61 and 62 which close when the operating coil 50 of the relay is energized, and the relay 13 is provided with three sets of normally open contacts 11, 63 and 64 which close when the relay coil 51 is energized, both coils 50 and 51 obtaining operating current from the source 39 when the proper circuits are closed.

During the operation of the apparatus it is required that the space on the scale between the contact segments 32 and 33 represent the minimum permitted capacity at one time and the maximum permitted capacity at another time. In order to effect these conditions and to extend the range of condensers that may be tested with microfarad meters having a particular range, standard condensers 71, 72, 73 and 74 having variable capacitance ranges are connectable in series or in parallel with the condenser unit under test, depending on whether the condenser under test is above or below the range of the meter used, thereby producing a resultant capacitance within the range of the meter used.

Two standard condensers are used in the test for each condenser unit. One standard condenser is adjusted to a predetermined capacitance to be used in the test for minimum permissible capacity and the other standard condenser is adjusted to a capacitance value to be used in the test for maximum permissible capacity. This is accomplished in the following manner: In the case of condensers under test that have permissible limits below the range of the microfarad meter, sufficient capacitance in one of the standard condensers is connected in parallel with the condenser under test to make the resultant sum of the capacitance of the standard condenser and the maximum permissible capacitance of the condenser under test equal to the capacitance value representing the division point between the two contact segments on the meter scale. In a like manner capacitance from a second standard condenser is paralleled with the condenser under test to make the resultant sum of the standard condenser capacitance and the minimum permissible capacitance of the condenser under test equal to the capacitance value representing the division point between the two contact points on the meter scale. For example, if the capacitance value representing the division point between the contact segments on the meter scale is .63 microfarad and the condenser to be tested has the permissible limits of maximum .13 microfarad and minimum .10 microfarad, then the standard condenser used in maximum limit test should have a value of .50 microfarad and the standard condenser used in the minimum limit test should have a value of .53 microfarad.

In case of condensers under test that have permissible limits above the range of the microfarad meter sufficient capacitance from one of the standard condensers is connected in series with the condenser under test to make the resultant capacitance of the standard condenser and the maximum permissible capacitance of the condenser under test equal to the capacitance value representing the division point between the contact segments on the meter. Similarly sufficient capacitance from the second standard condenser box is connected in series with the condenser under test to make the resultant capacitance of the standard condenser and the minimum permissible capacitance of the condenser under test equal to the capacitance value representing the division point between the two contact segments on the scale of the microfarad meter. For example, if the capacitance representing the division point between the contact segments on the meter is .63 microfarad and the condenser to be tested has the permissible limits of maximum 2.50 and minimum 2.00 microfarads, then the standard condenser used in the minimum limit test should have a capacitance value of .92 microfarad and the capacitance value of the standard condenser to be used in the maximum limit test should be .84 microfarad.

Standard condensers 71 and 72 are the standards associated with the condenser 3 under test and the microfarad meter 14, and the standard condensers 73 and 74 are the standards associated with the condenser 4 under test and the microfarad meter 15. Switches 80 and 81 provide a means for selecting the minimum and maximum standard for the respective condensers under test, and switches 82 and 83 are used to connect the selected standard condensers either in series or in parallel with the associated condenser unit under test. For example, when the switches 82 and 83 are in their upward position the selected standard condensers will be in series with the condensers under test, and if these switches are operated downward, then the selected standard condensers will be in parallel with the condensers under test.

A single condenser unit 3 may be checked for maximum and minimum capacitance by connecting the unit to the test fixture 5, as indicated in the drawing, which also illustrates the initial positions of all the switches for this test. Since a single unit is being tested, condenser 4 will not be connected to the test fixture. The position of switch 82 will depend on whether the range of the microfarad meter 14 is above or below the required capacity of the condenser 3. With switch 80 in the downward position shown in the drawing the standard condenser 72 is connected in series with condenser 3 and the meter 14. Assuming that condencer 72 is the maximum standard then the space between the contact segments 32 and 33 of the meter 14 will represent the maximum permissible limit of capacitance.

To power the meter 14 switch 26 is closed, and if the capacitance of the condenser 3 is less than the maximum, then the needle 20 of the meter 14 will swing to the right from its zero position at the left and will come to rest at some point to the left of the space between the contact segments 32 and 33 and above the segment 32. Switch 40 is then closed for a short time to energize the relay 38 and operate the depressor bar 42. This depresses the needle 20 to complete an electrical path between the depressor bar and the contact 32 and closes the circuit from the source 39 to the operating coil 50 of the relay 12 thereby operating the relay to close the contacts 10, 61 and 62. Since closure of the contacts 61 furnishes current from the source 39 to the coil 50 by an alternative path, the switch 40 may be opened to release relay 38, and the relay 12 will remain locked after contact is broken between the depressor bar 42 and the contact segment 32.

Next the switch 80 is operated upward to connect the minimum standard condenser 71 into the circuit with condenser 3 and the meter 14, thereby making the space between the contact segments 32 and 33 representative of the minimum permissible capacitance. If the capacitance of the condenser 3 is higher than the minimum limit, then the needle 20 will swing to the right and come to rest in a position to the right of the space between the contact segments 32 and 33 and above the segment 33. Switch 40 is then closed to depress the needle 20, this time to complete a path from the source 39 to the operating coil 51 and operate the relay 13 to close the contacts 11, 63 and 64. Closure of contacts 63 locks the relay and the switch 40 may be opened.

Both relays 12 and 13 being locked in an operated position, an electrical path is completed from the open switch 9 to the operating coil switch of the acceptance device 7 through closed contacts 10 and 11. It will be noted that the other end of the coil 6 is connected to one side of the source of electrical current 8 and that the other side of the source 8 is connected to the switch 9. To complete the test the switch 9 is operated, thus energizing the coil 6 with electrical current from the source 8. As pointed out before, the fact that the coil 6 has been energized at the end of the test indicates that the condenser unit 3 under test passed the test successfully in that its capacitance fell between the maximum and minimum permissible limits. If the condenser 3 had failed in either the maximum or minimum tests, then one of the relays 12 or 13 would not have been operated and the circuit between the source 8 and the coil 6 could not be completed by the closure of switch 9 and the coil 6 would remain unenergized at the end of the test, thus indicating that the condenser 3 has failed the test. To prepare the apparatus for testing another condenser the switches 9 and 26 are opened, and a switch 84 is momentarily opened to release the locked relays 12 and 13.

In cases where two separate condensers 3 and 4 are mounted in a single can it may be desirable to check the capacitance conditions with respect to maximum and minimum limits of both condensers simultaneously. To effect this, condensers 3 and 4 are connected to the test fixture 5, as shown in the drawing. Switches 82 and 83 are operated to their proper positions depending on the range of the meters 14 and 15, and the switches 80 and 81 are operated downward to connect maximum standard condensers 72 and 74 to their respective condensers under test 3 and 4. The initial position of the other switches is as shown in the drawing with the exception of switch 52 which, for this test, should be operated to the right to connect the lower ends of operating coils 50 and 51 to contact segments 53 and 54 respectively of the meter 15. Switch 26 is then closed to power the meters 14 and 15. It will be apparent that while the capacitance of the condenser 3 will be registered on the microfarad meter 14 the capacitance of the condenser 4 will be registered on the microfarad meter 15, both responses being simultaneous.

If the capacitance of both condensers is below their permissible maximum limits then the indicating needles of meters 14 and 15 will come to rest in a position at the left of the critical points and over contact segments 32 and 53 of the respective meters, and upon operation of the depressor bars 42 and 60 upon the closure of switch 40, the operating coil 50 of the relay 12 will be energized to operate the relay and close contacts 10, 61 and 62. Current is received by the coil 50 from the source 39 by means of the following path from the connection 43 of the source 39 through the depressor bar 42, the needle contact 34, the contact segment 32, the coil 50, the switch 52, the contact segment 53, the needle contact 90, and the depressor bar 60 to ground. Switch 40 is then opened and switches 80 and 81 are operated upward to connect the minimum standards 71 and 73 to the circuit. If the capacitances of the condensers 3 and 4 are above the permissible minimum limit, then the indicating needles of meters 14 and 15 will come to rest in a position to the right of the critical points on the meters and above the contact segments 33 and 54 of the respective meters, and upon operation of the depressor bars 42 and 60 by the closure of switch 40, the operating coil 51 of the relay 13 will be energized to operate the relay and close contacts 11, 63 and 64. The current path from the source 39 to the coil 51 is as follows: From the terminal source 43 through the depressor bar 42, the needle contact 34, the contact segment 33, the coil 51, the switch 52, the contact segment 54, the needle contact 90, the depressor bar 60 and thence through ground to the terminal 44 of the source 39. Relays 12 and 13 are locked, and when switch 9 is closed, the coil 6 will be energized as hereinbefore explained.

If either or both of the condensers 3 and 4 had failed in either or both the maximum and the minimum tests, then either or both of the relays 12 and 13 would not have operated thereby making it impossible to energize the operating coil 6 upon the closing of the switch 9.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for determining the capacitance of condensers comprising a first capacity meter responsive to an electrical capacitance to be measured, said meter having a first circuit closing means operative in a range of values of said capacitance below a critical value, said meter also having a second circuit closing means operative in a range of values of said capacitance above said critical value, variable condensers for changing the range of said meter so that the first and second circuit closing means will respond to values of said capacitance below and above, respectively, of a second critical value, a second capacity meter responsive to an electrical capacitance to be determined, said second meter having a first circuit closing means operative in a range of values of said capacitance below a critical value, said second meter also having a second circuit closing means operative in a range of values of said capacitance above the last-mentioned critical value, variable condensers for changing the range of the second meter so that the first and second circuit closing means of said second meter will respond to values of said capacitance below and above, respectively, of a critical value other than the last-said critical value, a first relay having its operating coil in series with the first circuit closing means of both meters and a source of current and operable in response to the contemporaneous operation of the first circuit closing means of both meters, a second relay having its operating coil in series with the second circuit closing means of both meters and a source of current and operable in response to the contemporaneous operation of the second circuit closing means of both meters, and an electromagnetic acceptance device energizable to a nonrejecting position through normally open contacts